(12) United States Patent
Beierl et al.

(10) Patent No.: US 12,735,125 B2
(45) Date of Patent: Sep. 15, 2026

(54) ADJUSTABLE MOTOR VEHICLE LATERAL AIR DEFLECTOR ARRANGEMENT

(71) Applicant: Dr. Ing. h.c. F. Porsche Aktiengesellschaft, Stuttgart (DE)

(72) Inventors: Dominik Beierl, Kontal-Münchingen (DE); Bernd Herrmann, Ehningen (DE); Joachim Paul, Benningen a.N. (DE); Okan Gönüldinc, Ostfildern (DE); Moritz Zeh, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 293 days.

(21) Appl. No.: 18/617,744

(22) Filed: Mar. 27, 2024

(65) Prior Publication Data

US 2024/0343321 A1 Oct. 17, 2024

(30) Foreign Application Priority Data

Apr. 12, 2023 (DE) ......................... 102023109169.7

(51) Int. Cl.
*B62D 35/00* (2006.01)
*B62D 37/02* (2006.01)

(52) U.S. Cl.
CPC ........... *B62D 35/008* (2013.01); *B62D 37/02* (2013.01)

(58) Field of Classification Search
CPC ..... B62D 35/007; B62D 35/008; B62D 35/02
USPC ........................................... 296/180.1, 180.5
See application file for complete search history.

(56) References Cited

U.S. PATENT DOCUMENTS

| | | | | |
|---|---|---|---|---|
| 2,893,727 | A | 7/1959 | Barnard | |
| 9,327,775 | B1 * | 5/2016 | Guenzel | B62D 35/008 |
| 11,679,823 | B2 * | 6/2023 | Moradnia | B62D 35/02 296/180.1 |
| 11,827,284 | B2 * | 11/2023 | Beierl | B62D 37/02 |
| 2016/0318560 | A1 * | 11/2016 | Kishima | B60Q 1/0035 |
| 2020/0391811 | A1 * | 12/2020 | Han | F16H 25/20 |

FOREIGN PATENT DOCUMENTS

| | | | | |
|---|---|---|---|---|
| DE | 102007003601 | A1 | 7/2007 | |
| DE | 102017208885 | A1 | 11/2018 | |
| DE | 102021118408 | B3 | 8/2022 | |
| GB | 2576754 | A * | 3/2020 | B62D 37/02 |

* cited by examiner

*Primary Examiner* — Jason S Daniels
(74) *Attorney, Agent, or Firm* — Buchanan Ingersoll & Rooney PC

(57) ABSTRACT

An adjustable motor vehicle lateral air deflector arrangement with a lateral air deflector which can be adjusted by electric motor between a rest position retracted into a body and an active position extended from the body. The arrangement includes (i) a guide link fixed to the vehicle with a longitudinal guide track oriented predominantly in the longitudinal direction of the motor vehicle, (ii) a link slide guided in the longitudinal guide track of the guide link, which holds the air deflector, and (iii) an electromotive link drive, which moves a flexible actuating cable that is attached to the link slide. The link drive can be arranged at a distance from the guide link so that a compact air deflector arrangement can be realized.

8 Claims, 3 Drawing Sheets

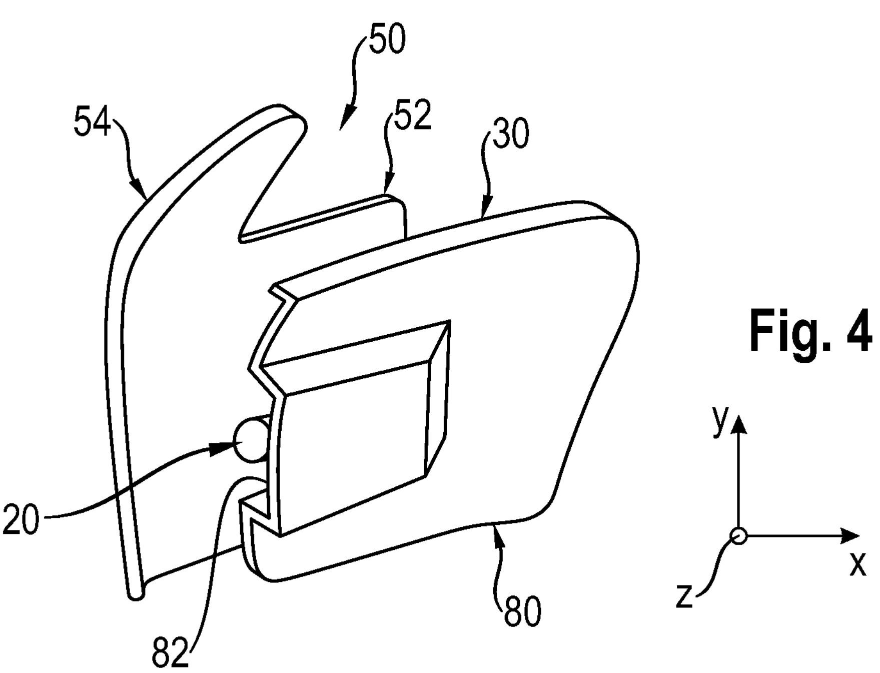
Fig. 4
Fig. 1
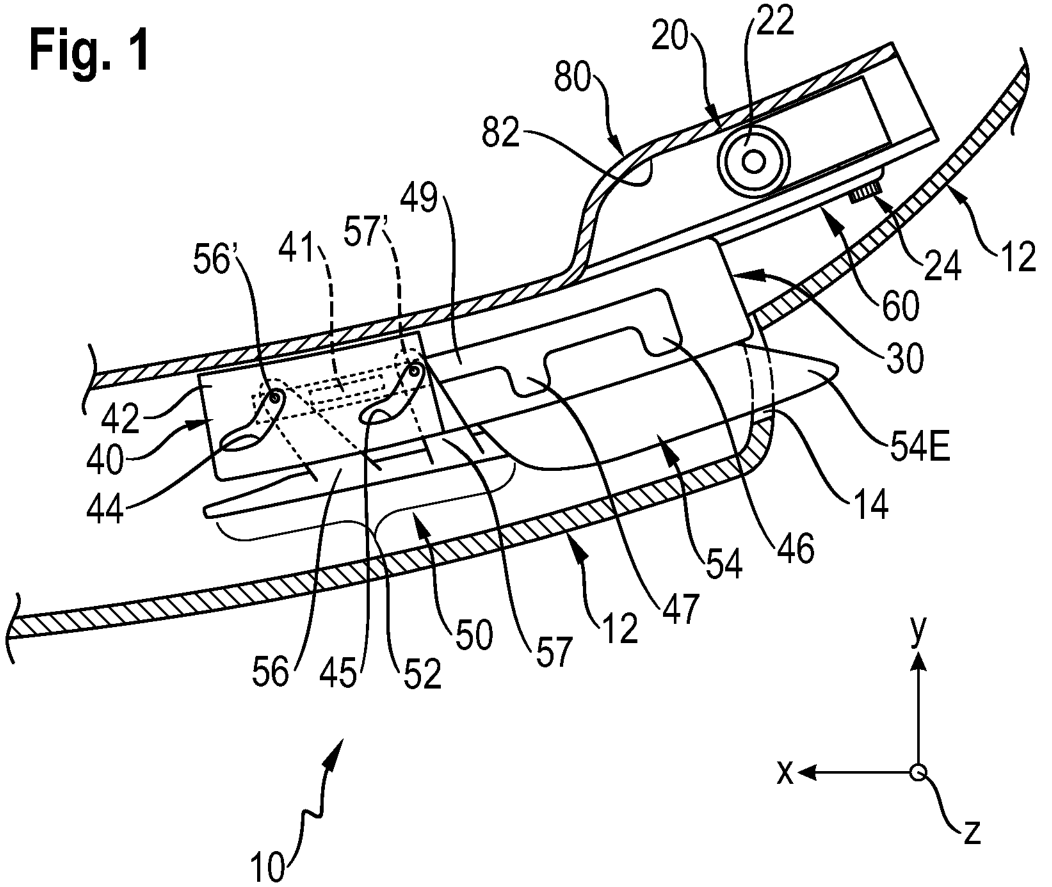

ADJUSTABLE MOTOR VEHICLE LATERAL AIR DEFLECTOR ARRANGEMENT

CROSS-REFERENCE TO RELATED APPLICATION

This application claims priority to German Patent Application No. 10 2023 109 169.7, filed Apr. 12, 2023, the content of such application being incorporated by reference herein in its entirety.

FIELD OF THE INVENTION

The invention relates to an adjustable motor vehicle lateral air deflector arrangement with a lateral air deflector that can be adjusted by an electric motor between a retracted rest position and an extended active position.

BACKGROUND OF THE INVENTION

Lateral air deflectors are preferably used in the side areas of motor vehicles, especially passenger cars, to improve the lateral stall at higher speeds. In the aerodynamic sense, an air deflector can be a spoiler or a blade around which air flows on both sides.

A typical motor vehicle lateral air deflector arrangement is known from DE 10 2021 118 408 B3, which is incorporated by reference herein. The air deflector arrangement has a multi-lever kinematic arrangement in order to execute a movement for the air deflector between a rest position and an active position both with a movement component in the longitudinal direction of the motor vehicle to the rear and with a movement component in the transverse direction of the motor vehicle outwards to the side. The kinematic arrangement is structurally complex. In the active position of the air deflector, the kinematic arrangement is exposed to water, snow and dirt from outside.

SUMMARY OF THE INVENTION

Described herein is a simple and reliable adjustable motor vehicle lateral air deflector arrangement.

The motor vehicle lateral air deflector arrangement according to aspects of the invention has a lateral air deflector, also known as a side blade, which can be adjusted by electric motor between a rest position retracted into a motor vehicle body and an active position extended from the body. It is particularly preferred that a motor vehicle lateral air deflector arrangement according to aspects of the invention is provided on both the right-hand side and the left-hand side of the motor vehicle in mirror symmetry to each other. The air deflector is at least partially retracted into the body at least in its retracted rest position. In its extended active position, most or all of the longitudinal extent of the air deflector is extended out of the body.

The air deflector arrangement has a vehicle-fixed guide link with a longitudinal guide track oriented predominantly in the longitudinal direction of the motor vehicle. Preferably, two parallel guide links or longitudinal guide tracks can also be provided. A link slide is guided in the longitudinal guide track of the guide link, which carries or holds the air deflector. Between the rest position and the active position, the link slide therefore performs an essentially linear and essentially longitudinal movement in a horizontal plane. The movement component in the longitudinal direction is always greater than the movement component in the transverse direction.

The air deflector arrangement has an electromotive link drive that moves a flexible actuating cable attached to the link slide. By using a flexible actuating cable between the electromotive link drive and the link slide, the link drive can be provided and mounted in a relatively freely selectable position, so that in this way a compact air deflector arrangement can be realized, which can be adapted relatively easily to the available installation space.

Since the movement of the link slide between the rest position and the active position is essentially, although not necessarily exclusively, linear, an actuating cable transmitting a linear movement is a simple, reliable and inexpensive machine element for transmitting the movement from the link drive to the link slide.

Preferably, the link slide in turn has at least one transverse link track, the orientation of which has a significant component in the transverse direction of the motor vehicle and through which a blade carrier is guided, which directly supports the air deflector. While the movement of the air deflector in the longitudinal direction is essentially defined by the body-fixed guide link, the movement of the air deflector in the transverse direction is essentially defined by the transverse link track of the link slide. In this way, a superimposed double guide is realized.

It is preferable that a transverse movement of the air deflector only takes place at the end of the longitudinal movement defined by the guide link in the direction of the active position. In this way, the air deflector is first moved out of the body in a longitudinal direction and is only then moved in a transverse direction. Preferably, the longitudinal guide track and the link track can be designed in such a way that the transverse link track is only released when the link slide is in the extended active position. As the air deflector is preferably moved in the longitudinal direction in its own base plane, only a relatively small, gap-like vertical body opening is required for the air deflector to pass through.

Preferably, the actuating cable is part of a Bowden cable, so that the actuating cable is guided between the link drive and the guide link in a Bowden cable sheath. In this way, both a pulling and a pushing movement can be transmitted through the actuating cable.

In particular, the actuating cable has linear toothing and the link drive has an output gearwheel that corresponds to or complements the linear toothing and meshes with the linear toothing. The linear toothing can be provided on a single side of an actuating cable with a rectangular cross-section, preferably made of plastic, but can alternatively be provided around the entire circumference of an actuating cable with a circular cross-section. It is particularly preferable for the actuating cable to have the linear toothing over its entire length, so that the entire actuating cable can be designed as a single piece. This type of actuating cable is also known as a flex cable with toothing.

In a particularly preferred embodiment, two actuating cables are provided, which are driven synchronously by the link drive. This means that the two actuating cables move the link slide synchronously between its retracted rest position and its extended active position. This can also permanently prevent the link slide from tilting in the guide link.

Preferably, the body has an essentially vertical and rearward-opening body opening through which the air deflector moves between its rest position and its active position. It is particularly preferred that a rear end of the air deflector fills or closes the body opening when the air deflector is in the rest position. As a result, the entire kinematic mimic inside the body is well protected against the ingress of water, dirt or snow from the outside, especially when the air deflector is in its rest position.

BRIEF DESCRIPTION OF THE DRAWINGS

An example embodiment of the invention will be explained in further detail in the following with reference to the figures. The FIGs. show:

FIG. 1 is a horizontally cut top view of an adjustable motor vehicle lateral air deflector arrangement with an air deflector in its rest position retracted into the body.

DETAILED DESCRIPTION OF THE INVENTION

Figure 2:
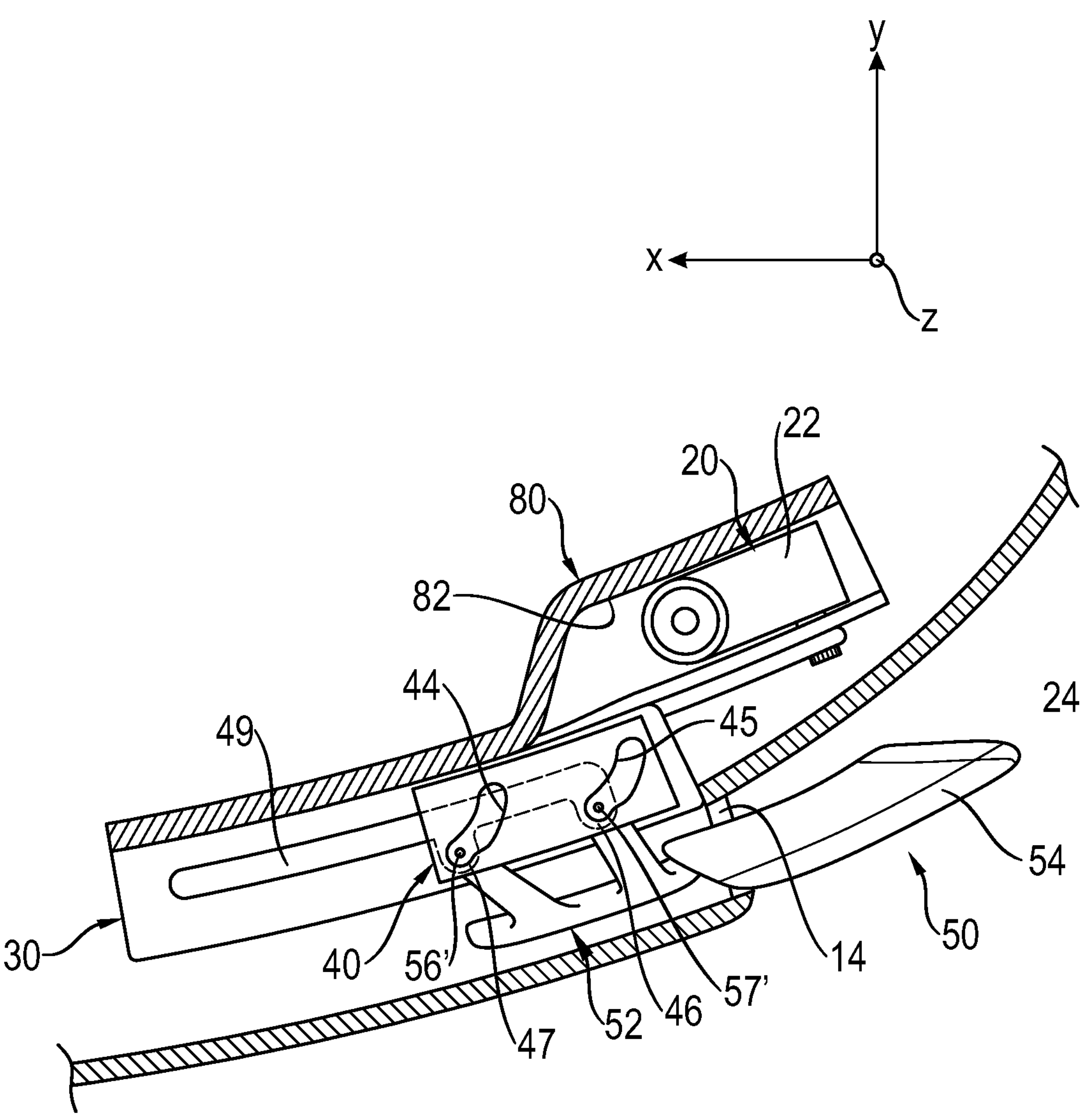
FIG. 2 shows the motor vehicle lateral air deflector arrangement of FIG. 1 with the air deflector extended into its active position, FIG. 3 a side view from the outside of a mounting wall of the motor vehicle lateral air deflector arrangement of FIGS. 1 and 2, with a link drive and two guide links, FIG. 4 a side view of the mounting wall of FIG. 3 from the inside, including the air deflector.

The FIGs. show an adjustable motor vehicle lateral air deflector arrangement 10, which has a lateral air deflector 54 that can be adjusted by an electric motor between a rest position retracted into a motor vehicle body 12, which is shown in FIG. 1, and an active position extended from the body 12, which is shown in FIG. 2. FIGS. 1 and 2 show a left-hand rear section of a motor vehicle in plan view of a horizontal sectional plane xy. The spatial directions indicated in the FIGs. are the longitudinal direction x of the motor vehicle, the transverse direction of the motor vehicle y and the vertical direction z of the motor vehicle.

The air deflector arrangement 10 has two vehicle-mounted guide links 30, 30', both of which are arranged in a horizontal plane xy and are vertically spaced apart from one another. The two guide links 30, 30' are attached to a mounting wall 80, which has a proximal drive recess 82 in which an electromotive link drive 20 is arranged. The body 12 shown here consists essentially of a vertical body wall, which has a slot-like body opening 14 located essentially in a vertical transverse plane, through which the air deflector 54 passes between its retracted rest position and its extended active position.

Each guide link 30, 30' has a longitudinal guide track 49 oriented predominantly in the longitudinal direction x of the motor vehicle, in which a link slide 40 with its guide block 41 is positively guided in the longitudinal direction. Each guide link 30, 30' also has two short transverse guide tracks 46, 47, which, however, do not serve to guide the link slide 40, which is guided exclusively in the longitudinal direction.

For its part, the link slide 40 has two transverse link tracks 44, 45, in each of which a guide pin 56', 57' of a blade carrier 52 is guided. The two transverse link tracks 44,45 are each located in the same horizontal plane and are not oriented in the transverse direction y, but are oriented with an inclined orientation between the transverse direction y and the longitudinal direction x. The two guide pins 56', 57' of the blade carrier 52 also project vertically into the longitudinal guide track 49 and the transverse guide tracks 46, 47. The link slide 40 is formed by a one-piece plastic link slide body 42.

The blade carrier 52 comprises two carrier arms 56, 57, each of which comprises one of the two guide pins 56', 57', and both of which are connected in one piece to the air deflector 54 and hold it. The blade carrier 52 and the air deflector 54 consist of a one-piece plastic blade body 50.

The link drive 20 has an electric drive motor 22, which rotationally drives an output gearwheel 24. The output gearwheel 24 in turn engages with a linear toothing 67 of two flexible actuating cables 66, which are each part of an upper and a lower Bowden cable 60, 62. Each Bowden cable 60, 62 also has a Bowden cable sheath 64 in which the Bowden actuating cable 66 is guided in a sliding manner. The drive-side end of the Bowden cable sheath 64 is fixed to the link drive 20 with a sheath clamp 69. The respective end of the Bowden actuating cable 66 on the slide side is attached to the upper or lower end of the link slide 40.

Figure 3:
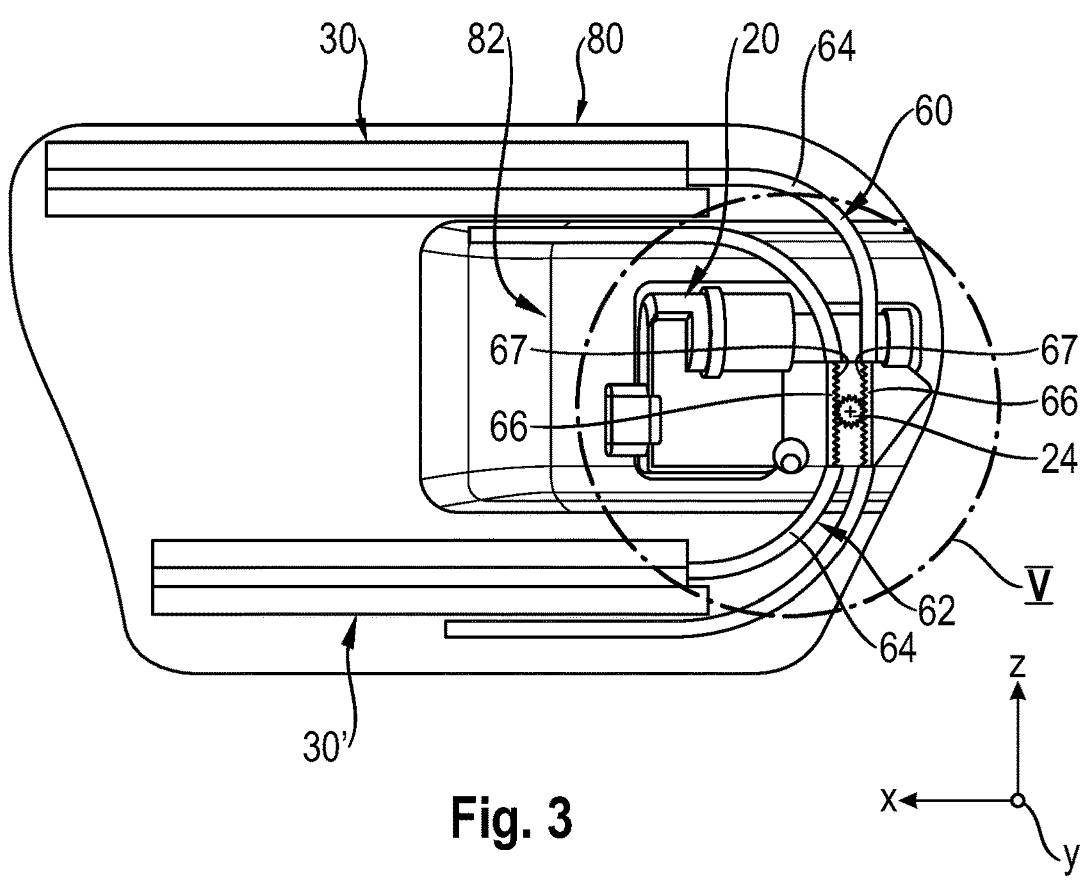
Figure 5:
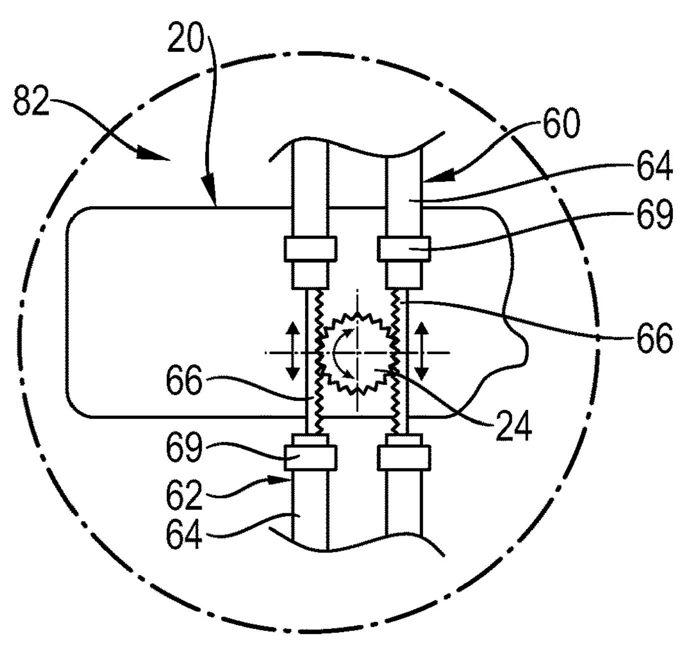
FIG. 5 is an enlarged view of a detail V of FIG. 3 including the link drive.

With reference to FIGS. 3 and 5, when the output gearwheel 24 is rotated clockwise, the link slide 40 and the air deflector 54 are moved to the rest position shown in FIG. 1, and when the output gearwheel 24 is rotated counterclockwise, they are moved to the active position shown in FIG. 2. During the last phase of the movement into the active position shown in FIG. 2, the two guide pins 56', 57' and with them the air deflector 54 are forced to move outwards in the transverse direction by the two transverse link tracks 44, 45. Conversely, at the beginning of the transfer from the active position shown in FIG. 2 back to the rest position shown in FIG. 1, the two guide pins 56', 57' and with them the air deflector 54 are moved inwards in the transverse direction by the two transverse link tracks 44, 45 in cooperation with the two transverse guide tracks 46, 47 before the longitudinal movement of the link slide 40 defined by the longitudinal guide tracks 49 begins.

As can be seen in FIG. 1, the body opening 14 is practically completely filled and closed by the rear end 54E of the air deflector 54 in the rest position of the air deflector 54, so that only a circumferential gap remains. Even in the active position shown in FIG. 2, the air deflector 54 fills the body opening 14 almost completely. In this way, the sensitive part of the guide arrangement inside the body 12 is always well shielded and protected against the ingress of water, snow and dirt from outside.

What is claimed is:

1. An adjustable motor vehicle lateral air deflector arrangement comprising:

a lateral air deflector which is configured to be adjusted by an electric motor between a rest position retracted into a body of a motor vehicle and an active position extended out of the body, a guide link that is configured to be fixed to the motor vehicle, the guide link having a longitudinal guide track oriented predominantly in a longitudinal direction of the motor vehicle, a link slide guided in the longitudinal guide track of the guide link, which link slide holds the air deflector, and an electromotive link drive, which moves a flexible actuating cable that is attached to the link slide, wherein the link slide has at least one transverse link track which has a component in a transverse direction of the motor vehicle and in which a blade carrier is guided which carries the air deflector.

2. The adjustable motor vehicle lateral air deflector arrangement according to claim 1, wherein the longitudinal guide track and the link track are configured such that the transverse link track is released exclusively in the active position of the link slide.

3. The adjustable motor vehicle lateral air deflector arrangement according to claim 1, wherein the actuating cable is part of a Bowden cable.

4. The adjustable motor vehicle lateral air deflector arrangement according to claim 1, wherein the actuating cable has a linear toothing and the electromotive link drive has an output gearwheel corresponding to the linear toothing.

5. The adjustable motor vehicle lateral air deflector arrangement according to claim 1, further comprising another flexible actuating cable, which flexible actuating cables are synchronously driven by the link drive.

6. The adjustable motor vehicle lateral air deflector arrangement according to claim 1, wherein the body comprises a substantially vertical and rearwardly opening body opening through which the air deflector moves between the rest position and the active position.

7. The adjustable motor vehicle lateral air deflector arrangement according to claim 6, wherein a rear end of the air deflector fills the body opening in the rest position of the air deflector.

8. A motor vehicle comprising the adjustable motor vehicle lateral air deflector arrangement according to claim 1.

* * * * *